Jan. 9, 1962 H. W. KADELL 3,016,478
LIGHT FLASHING DEVICE
Filed Aug. 11, 1959 2 Sheets-Sheet 1
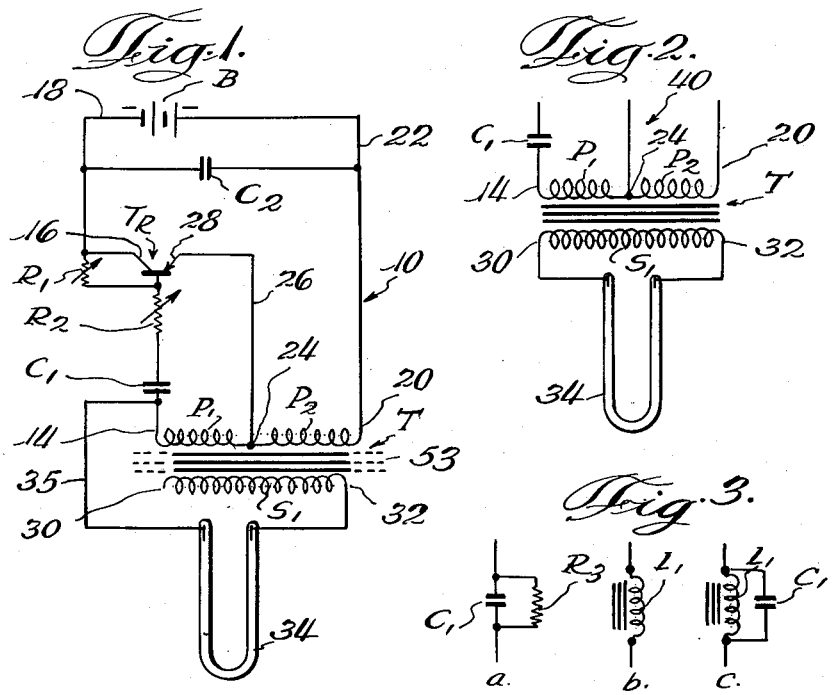
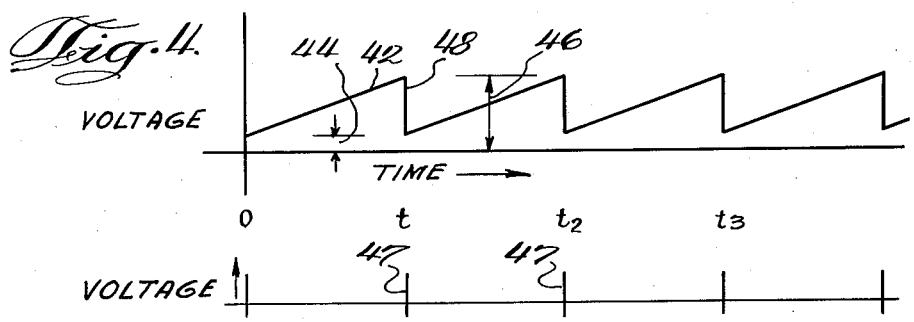
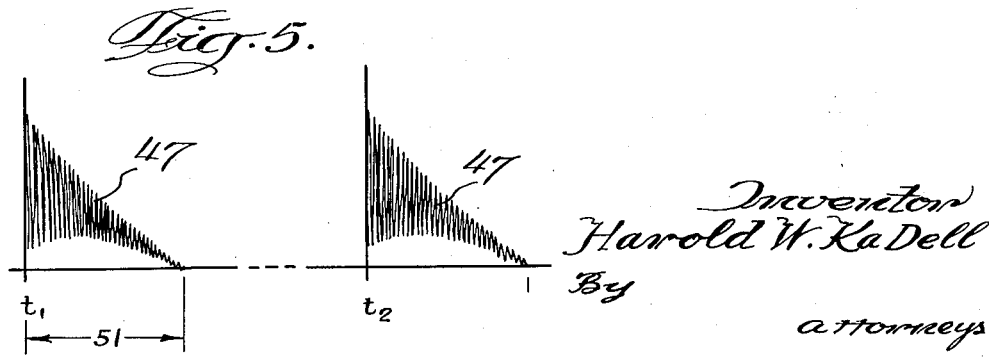
Inventor
Harold W. KaDell
By
attorneys Jan. 9, 1962 H. W. KADELL 3,016,478
LIGHT FLASHING DEVICE
Filed Aug. 11, 1959 2 Sheets-Sheet 2
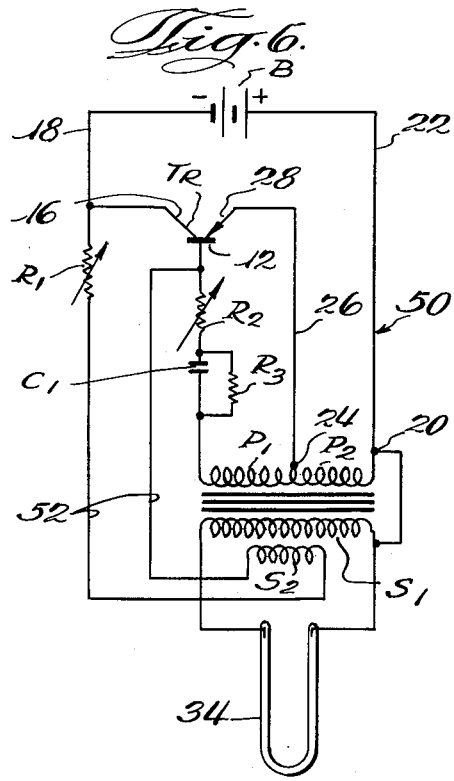
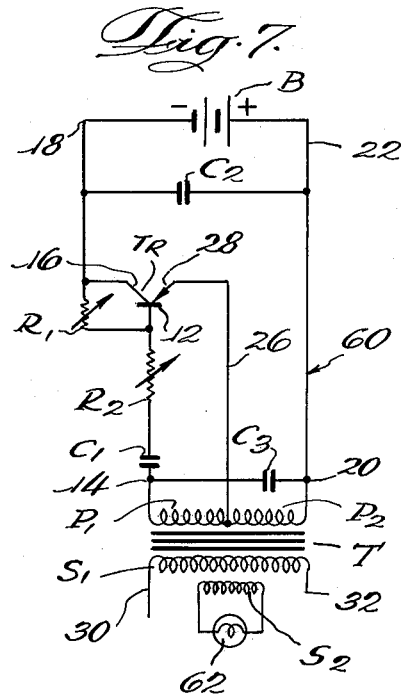
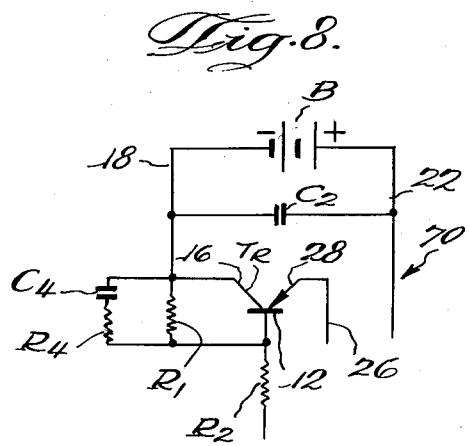
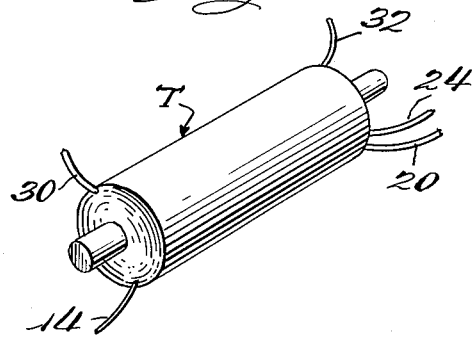
Inventor
Harold W. Kadell
By
Attorneys

United States Patent Office 3,016,478
Patented Jan. 9, 1962

3,016,478
LIGHT FLASHING DEVICE
Harold W. KaDell, Highland Park, Ill., assignor to Illum-A-Rail, Inc., Chicago, Ill., a corporation of Illinois
Filed Aug. 11, 1959, Ser. No. 833,015
24 Claims. (Cl. 315—206)

This invention relates generally to flashing devices, and more particularly is concerned with a structure which operates from low voltage battery sources and flashes a gaseous discharge lamp or similar light source.

There have been many circuits devised for use in flashing light sources, but to the best of my knowledge, these have invariably required large and expensive components, high voltage batteries, relays, complex circuitry and the like.

The primary object of this invention is to provide a novel light flashing device which is simple, which uses a minimum of components, which is economical both from the standpoint of the character of components and from the standpoint of maintenance.

The flashing device which is described in the specification below is especially intended for use in advertising products, but is not limited to such use. It has been found that one of the ways of attracting the attention of a purchaser is by means of flashing lights. In a retail establishment, such as a food market where there are a myriad of products on display, the competition between products for the buyer's attention is keen. The flashing light display is effective, but expensive, and often objectionable to the store owner because of power requirements, connecting wires, size, etc. It has been found that the time that the light is on need not be very great to attract attention, and hence the flashing device can energize the light source with very sort pulses, with a relative longer time between pulses.

This arrangement will be recognized as one which is also suitable for warning devices on road repairs, etc.

The invention herein is suitable for encapsulation or enclosure within housings of very small size, readily set up wherever desired and moved without the need for disconnecting wires and the like. Furthermore, the short flash and long "off" time draws very little current from the battery with which the circuit is connected so that the flashing can occur continuously and need not be turned off during times that the market is closed, for example.

Many objects and features of the invention will occur to those skilled in this art as the description thereof proceeds, in connection with which there have been illustrated several embodiments which are of preferred form, for the energization of gaseous discharge lamps, incandescent lamps, and so-called luminescent lamps. It will be apparent from the examination of these illustrations and the descriptions thereof that the invention is susceptible of many different forms and variation in considerable detail without in any departing from the spirit or scope of the invention.

In the drawings:

FIG. 1 is a circuit diagram of a flashing light circuit embodying the invention which may use a gaseous discharge lamp as a light source.

FIG. 2 is a fragmentary portion of the circuit of FIG. 1 but showing a modified form of the invention.

FIGS. 3a, 3b and 3c illustrate variations in the storage element of the circuits of FIGS. 1 and 2.

FIG. 4 is a diagram showing two graphs, one comprising the wave form of the signal on the storage element of a flashing light circuit of the invention, and the other comprising the voltage of the transformer of the circuit, both graphs being on the same time scale.

FIG. 5 is a graph similar to that of the lower portion of FIG. 4 but on a greatly enlarged time scale.

FIG. 6 is a circuit diagram showing another modified form of the structure illustrated in FIG. 1.

FIG. 7 is a circuit diagram of the invention showing another modified form which uses an incandescent lamp bulb as the flashing light source.

FIG. 8 is a fragmentary portion of the circuit of FIG. 1 but showing still a further modified form of the invention.

FIG. 9 is a perspective view showing the physical appearance of a feedback transformer suitable for use with the circuit of the invention.

The invention is based upon the application of a blocking oscillator to provide a high voltage, short duration pulse from a low voltage D.C. source, utilizing a simple and very effective circuit. To the best of my knowledge, other blocking oscillator circuits in the past have invariably required at least two transistors and more components than used in this invention. In this invention only a single transistor is utilized, but in an unusual manner so that the desired results are obtained.

In FIG. 1 there is a circuit diagram of a preferred form of the invention. This circuit is designated by the reference character 10 and comprises a blocking oscillator utilizing a single transistor $Tr$ which is arranged with its base 12 connected to the left terminal 14 of the primary winding $P_1$—$P_2$ of the transformer T through a resistor $R_2$ and a capacitor $C_1$. The collector 16 of the pnp transistor $Tr$ is connected to the negative terminal 18 of the battery B, and the second terminal 20 of the primary winding $P_1$—$P_2$ is connected to the positive terminal 22 of the battery B. A condenser $C_2$ shunts the battery B. Obviously in this circuit as in others described herein an npn transistor may be used by reversing battery polarity.

The center tap 24 of the primary winding divides the primary winding into two parts, $P_1$ and $P_2$ and this tap is connected by the lead 26 to the emitter 28 of the transistor $Tr$. There is a biasing resistor $R_1$ connected between the collector 16 and the base 12.

The transformer T has a very closely coupled, coaxially wound secondary winding $S_1$ which has one end free as at 30 and has its other terminal 32 connected to one electrode of a gaseous discharge tube 34 such as a neon, argon or similar gaseous discharge device. The second electrode of the tube 34 is connected to the terminal 14 by the lead 35.

In examining the circuit one is immediately impressed with the fact that the left-hand end 30 of the secondary winding $S_1$ is open. This is believed to account for a considerable saving in the circuit. There is believed to exist certain capacitive coupling with the primary winding which provides transfer of energy from the primary at the transformer ratio to energize the gaseous discharge device. This may be considered a form of autotransformation. It was found that the difference between this arrangement and that shown in FIG. 2 was quite substantial. In FIG. 2, which is a fragmentary circuit diagram of circuit 40, the output uses a straight transformer relationship. In all other respects the circuit is identical to the circuit 10 of FIG. 1. Here the secondary $S_1$ has its terminals 30 and 32 connected across the gaseous discharge tube 34. The circuit of FIG. 1 was found to give satisfactory operation with the condenser $C_1$ having approximately half the capacitance of the condenser $C_1$ of FIG. 2. This decreased the instantaneous peak currents and hence increased the battery life.

In the circuits of FIGS. 1 and 2, the flashing rate, that is the frequency of the blocking oscillator is determined by the resistance of the resistors $R_1$ while the duration of the flash is determined by the values of the components in the base-emitter circuit. Thus, varying $R_2$, $C_1$ and the inductance of the transformer primary $P_1$ will change the duration of the flash. For example, in a circuit where desired, the resistors $R_1$ and $R_2$ can be variable to change rate and duration of flash.

The duration of the flash can also be adjusted over a wide range by varying the storage element of the circuit, that is, the condenser $C_1$ both as to its capacitance and as well as to its tuning. For example, in FIGS. 3a, 3b and 3c different forms of the storage element are shown. In 3a, there is a resistor $R_3$ shunting the condenser $C_1$, in 3b there is a choke $L_1$ in place of the condenser $C_1$, and in 3c the condenser $C_1$ and choke $L_1$ are in parallel.

The circuit operates in a manner somewhat as illustrated in the wave shape diagrams of FIGS. 4 and 5. The voltage across the storage element, such as $C_1$ builds up while the transistor Tr conducts, rising in a charging characteristic along the line 42 from a minimum value 44 to a maximum value 46. The charging rate is determined by the current carrying characteristic of the transistor and the total resistance of the circuit across the condenser $C_1'$ When the charge on the condenser builds up to a maximum value 46, the transistor base emitter circuit becomes conductive and the condenser $C_1$ discharges along line 48 through the tank circuit which includes the primary part $P_1$ and the by-pass lead 26 to the emitter 28 and during this time there is a ringing of the circuit because of the discharge pulse 48 causing a sudden inductive "kick" in the transformer primary. This produces a high frequency oscillation in the transformer which produces currents of short duration but high amplitude. The pulse occurs only during the discharge of the condenser $C_1$ and since the condenser charge curve 42 may have a very long duration, the discharge pulse on the same time scale will look like a narrow pip as at 47. The time of the rise 42 may be of the order of a second or more, while the discharge would be of the order of five microseconds.

In FIG. 5 the voltage across the transformer $P_1$—$P_2$ is shown spread out on a longer time scale. The discharge 47 is seen to comprise a complicated and not easily analyzed transient occupying the time designated 51 along the time scale. This transient is shown to be continuous, but in an actual device it is asymmetrical along the time axis and full of "hash," high frequency components.

During the time that the condenser is building up its charge there is no output from the transformer because the slope of the characteristic 42 is very low. The rise is usually of the order of 1 volt, and in a time of one second or more, the change in current with respect to time in the primary $P_1$ is negligible. The drop along the discharge line 48 is extremely steep, so that the change in current with respect to time in the primary of the transformer T is very great. This provides the high voltage pulse 47 which is further transformed in the inductive circuit of the transformer, so that the voltage in the secondary may be extremely high, of the order of many thousands of volts, although a short pulse.

The operation of the circuit is to a great extent determined by the physical design of the transformer T, as shown in FIG. 9. The transformer is preferably wound on an extremely high permeability core such as one formed of powdered magnetic material, known as ferrite. The coils are wound as close together as possible, to minimize leakage inductance and provide as little delay as possible in the pulse. These coils are wound one on top of another. The core is of the order of 2.85 inches in length, with about 3/8 inch protruding from each end. The duration of the flash can be controlled by using different lengths protruding from the windings. These protruding ends are designated 53 and are symbolically designated by broken core lines in FIG. 1. The variation of the length of the core of the transformer T is believed to vary the "Q" of the transformer which controls the rate of rise of the current in the pulse in the transformer. This is related to the resonant period of the transformer.

The current flow in the circuit varies the bias of the transistor upon discharge to a condition of the characteristic where the current in the emitter-base circuit is so low as to be in effect a cut-off, whereupon the condenser $C_1$ again commences charging and the process continues.

The condenser $C_2$ is used to compensate for changes in the internal resistance of the battery B which occur when the battery voltage drops below normal. It assists the condenser $C_1$ to retain its charge more readily.

In FIG. 6 I have illustrated a modified form 50 of the invention which differs from those previously discussed in that there is a secondary winding $S_2$ connected by the leads 52 in series with the resistor $R_1$ across the base-collector circuit. The secondary winding $S_2$ is of very few turns compared to the secondary winding $S_1$ and is closely coupled therewith. This structure gave a longer "on" time. The reason for this may be the increase in impedance of the by-pass path of the resistor $R_1$ when the condenser $C_1$ is discharging, thus providing a varying bias for the transistor so that the transistor Tr stays substantially non-conducting for a longer period of time than otherwise.

In FIG. 7 there is illustrated a circuit 60 which is suitable for flashing a small incandescent bulb shown at 62. The circuit is quite similar to that of previously described embodiments, but differs in the respect that there is a condenser $C_3$ shunting the entire primary winding $P_1$—$P_2$ to give greater range in controlling the duration and frequency of the flashing, and a radical change in the construction of the transformer T. The secondary winding $S_1$ has both of its terminals 30 and 32 open, and there is a small secondary $S_2$ across which the lamp 62 is connected. The brightness of the flash is a measure of the amplitude of the voltage transferred to the secondary winding $S_2$ and hence is controlled by the number of turns of the secondary $S_2$. The secondary winding $S_1$ is believed to act as a storage element for the output of the transformer T and its presence has been found practically essential to obtaining a flash from an incandescent lamp in the particular circuit illustrated.

In FIG. 8 there is illustrated the upper portion of a circuit which is substantially the same as that of FIG. 1 except for the biasing element. The reference character 70 is used to designate this circuit which has a condenser $C_4$ and a resistor $R_4$ in series connected together across the resistor $R_1$.

In using several of the circuits which are described herein, notably that of FIG. 1, it was found that highly satisfactory results are obtained for normal battery life, that is, where the voltage of the battery B does not drop substantially below its "new" value. After some time, however, the voltage of a six volt battery, for example, may drop as much as two volts. This would result in the flashing stopping. It was found that the arrangement shown in FIG. 8 of the circuit 70 would keep the circuit flashing at very low battery voltages, as low as 3 volts where the battery normally is six volts. This increased the utility of the structure since it was unnecessary to change batteries too often. The use of a capacitive shunting circuit across the biasing resistor $R_1$ is believed in some way to assist in maintaining sufficient bias to keep the transistor sufficiently conductive as to its base-collector circuit to give the condenser $C_1$ an opportunity to charge up to its maximum value.

In order that the nature of the invention may be appreciated, several examples will be described as to their circuit constants to illustrate the simple nature of the components.

*Example A.—Circuit similar to that of FIG. 1*

Battery B _____volts dry cell__ 6
Transistor Tr _____ 2N555

| | | |
|---|---|---|
| $R_1$ | ohms | 11,000 |
| $R_2$ | do | 26 |
| $C_1$ | microfarads | 250 |
| $C_2$ | do | 50 |

The tube 34 was a neon tube five inches long 6 mm. in diameter. The transformer T was formed on a .25″ diameter ferrite rod about 2⅞ inches long. The primary $P_1$ was 50 turns of No. 24 copper wire and the primary $P_2$ was 100 turns. The secondary winding has 5000 turns of No. 38 copper wire. The peak pulse current in the output circuit was 100 milliamperes; at full battery strength the lamp flashed 40 times per minute. The distributed capacity of the winding $S_1$ was measured at about 225 micro-microfarads. The on time was about 10% of the off time. Other examples of this circuit used $R_1$ at 18,000 ohms and $R_2$ at 41 ohms. The condenser $C_1$ could be a much higher value, say 1000 microfarads, either with the circuit of FIG. 1 or the modified form of FIG. 2.

*Example B.—Circuit similar to that of FIG. 6*

| | | |
|---|---|---|
| Battery B | volts | 6 |
| Transistor $Tr$ | | 2N555 |
| $R_1$ | ohms | 5500 |
| $R_2$ | do | 7 |
| $R_3$ | do | 150 |
| $C_1$ | microfarads | 2000 |
| $C_2$ | do | 100 |

The same tube as above was used. Both primary parts had the same number of turns, namely 50 turns of No. 24 wire. The secondary winding $S_1$ had 7000 turns of No. 38 wire. The secondary winding $S_2$ had 30 turns of No. 24 wire.

In all examples, $R_1$ and $R_2$ can both be variable over wide ranges.

*Example C.—Circuit similar to that of FIG. 7*

| | | |
|---|---|---|
| Battery B and transistor $Tr$ | | Same as above |
| $R_1$ | ohms | 10,000 |
| $R_2$ | do | 30 |
| $C_1$ | microfarads | 250 |
| $C_2$ | do | 50 |
| $C_3$ | do | .005 |

The same ferrite core as above was used. $P_1$ and $P_2$ each had 50 turns of No. 24 wire. $S_1$ had 7000 turns of No. 38 wire. $S_2$ had 26 turns of No. 24 wire. The lamp was a 2 volt 60 milliampere lamp. This circuit was quite flexible and could be varied so that the frequency was from 10 to 100 per minute. The duration of "on" time could be varied from a few percent to as much as 75%.

*Example D.—Circuit similar to that of FIG. 8*

| | | |
|---|---|---|
| Battery B | volts | 6 |
| Transistor $Tr$ | | 2N307 |
| $R_1$ | ohms | 7600 |
| $R_2$ | do | 10 |
| $R_4$ | do | 930 |
| $C_1$ | microfarads | 500 |
| $C_2$ | do | 50 |
| $C_4$ | do | 3 |

The same ferrite core and gaseous discharge tube as described above was used. The primary part $P_1$ was 50 turns of wire while the primary part $P_2$ was 100 turns of wire. The secondary winding $S_1$ was of the same order as in FIG. 1. The pulse rate did not vary a great deal with change in battery voltage. It was found that variation of the values of the shunting circuit $R_4$ and $C_4$ also affected the rate of pulsing.

In connection with varying the length of the core, the light output can be changed by varying this length in the case of the gaseous discharge lamps. This often enables an adjustment for reduced power in batteries as they age, so that the flash is bright even though the battery commences to run down.

The invention is based upon actual devices constructed and operated, irrespective of whether the theories used to explain their operation is correct. The coverage is intended to be the broadest to which I am entitled in view of the prior art, all as stated in the appended claims.

What it is desired to secure by Letters Patent of the United States is:

1. A light flashing device which comprises, a three electrode transistor having base, emitter and collector electrodes, a transformer having a primary winding and a secondary winding, a source of direct current, a source of light, an oscillating circuit connected between said base and one of the other electrodes including at least a portion of the primary winding and a storage element therein, biasing means immediately connected between said base and a second of said other electrodes, said direct current source being connected across said transistor and transformer primary winding in series, said light source being coupled to said secondary winding.

2. A light flashing device in accordance with claim 1 in which said storage element is primarily capacitive.

3. A light flashing device as claimed in claim 1 in which said oscillating circuit has a variable component therein for adjusting the duration of the flash.

4. A light flashing device as claimed in claim 1 in which said biasing means includes a variable impedance for adjusting the frequency of flash.

5. A structure as claimed in claim 1 in which said biasing means comprises a resistor having a shunting capacitive circuit.

6. A light flashing device which comprises a transistor having a base, an emitter and a collector, a feedback transformer having a primary winding with end terminals and a tap, an oscillating tank circuit between said base and said emitter and including a charge storage element and part of said transformer primary between said tap and one end terminal, a secondary winding, a light source coupled to said secondary winding, a direct current source connected from said collector to the second end terminal, and a bias impedance connected between said collector and base.

7. A light flashing device as claimed in claim 6 in which said bias impedance comprises a resistor.

8. A light flashing device as claimed in claim 6 in which there is a second secondary winding on said transformer, and said bias impedance comprises a resistor connected in series with said second secondary winding.

9. A light flashing device which comprises, a transistor having a base, an emitter electrode and a collector electrode, connected as a blocking oscillator with a common base, a tank circuit including an inductance and a capacitance connected from the said base to one of the other electrodes of said transistor, a biasing element directly connected from the base to a second other electrode of said transistor, a source of direct current connected across the transistor and inductance, a second inductance magnetically coupled to said first inductance and a light source coupled therewith.

10. A light flashing device as claimed in claim 9 in which the two inductances comprise respectively the primary and secondary windings of a low Q transformer, and the light source is a gaseous discharge lamp.

11. A light flashing device as claimed in claim 9 in which the two inductances comprise the primary and secondary windings of a transformer, said transformer having a ferrite member as a core.

12. A light flashing device as claimed in claim 9 in which there is a condenser shunting the source of direct current, said source comprising a battery.

13. A light flashing device as claimed in claim 9, in which there is a third inductance, the first and third inductances being connected in series and together forming the primary winding of a transformer, the second inductance comprising the secondary winding of said transformer, the third inductance being connected in series with said direct current source.

14. A light flashing device as claimed in claim 9 in which said capacitance is connected in series in said tank circuit, and there is a second capacitance connected in parallel with said first inductance.

15. A light flashing device comprising a light source, a transformer having a primary and a high voltage secondary with said secondary having one end connected to one terminal of said light source which in turn has another terminal arranged to have a potential supplied thereto, a tap on said primary, a source of potential, one end of said primary being connected to one potential point of said source, a transistor having base, collector and emitter circuits with said emitter circuit connected to said tap, an RC circuit comprising a condenser connected across said source of potential and a resistor connected to the terminal of said condenser connected to a second point of potential of said source and immediately between said collector and base circuits, and another RC circuit connected between said base circuit and the other end of said primary.

16. A light flashing device which comprises a transistor having base, emitter and collector electrodes, a transformer having a primary winding and a secondary winding, a source of direct current, a source of light, an oscillating circuit connected between said base and one of the other electrodes including at least a portion of the primary winding and a storage element therein, and biasing means connected between said base and a second of said other electrodes, said direct current source being connected across said transformer primary winding in series, said light source being coupled to said secondary winding, said primary winding having two parts with a tap between the parts and end terminals, the first part of said primary winding being connected in said oscillating circuit from its terminal to said tap while the second part is not, said direct current source being connected from said second electrode to the end terminal of said second part.

17. A light flashing device which comprises a transistor having base, emitter and collector electrodes, a transformer having a primary winding and a secondary winding, a source of direct current, a source of light, an oscillating circuit connected between said base and one of the other electrodes including at least a portion of the primary winding and a storage element therein, and biasing means connected between said base and a second of said other electrodes, said direct current source being connected across said transformer primary winding in series, said light source being coupled to said secondary winding, said secondary winding having two end terminals, one of which is physically free, the second of which is connected to one side of said light source, the other side of said light source being connected to a terminal of said primary winding which is included in said oscillating circuit.

18. A light flashing device which comprises a semiconductor having a base electrode, an emitter electrode and a collector electrode, connected as a blocking oscillator with a common base, a tank circuit including an inductance and a capacitance connected from the said base to one of the other electrodes of said semi-conductor, a biasing element connected from the base to a second other electrode of said semi-conductor, a source of direct current connected across the semi-conductor and inductance, a second inductance magnetically coupled to said first inductance, a light source coupled therewith, and a third inductance magnetically coupled to the other two, said third inductance having its ends physically free, the light source being connected across the ends of the second inductance and comprising a tungsten lamp.

19. A light flashing device which comprises a semiconductor having a base electrode, an emitter electrode and a collector electrode, connected as a blocking oscillator with a common base, a tank circuit including an inductance and a capacitance connected from the said base to one of the other electrodes of said semi-conductor, a biasing element connected from the base to a second other electrode of said semi-conductor, a source of direct current connected across the semi-conductor and inductance, a second inductance magnetically coupled to said first inductance, and a light source coupled therewith, the two inductances comprising the primary and secondary windings of a transformer, said transformer having a ferrite member as a core, with the ends of the ferrite member protruding beyond the physical ends of the primary and secondary windings.

20. A light flashing device comprising a transformer having a primary and a high voltage secondary, a light source connected on one side to one end of said secondary and arranged to be connected on its other side to an energizing point of potential, a tap on said primary, a condenser having one terminal connected to one end of said primary, a source of potential having one terminal connected to the other end of said primary, and an amplifying device having a pair of input terminals connected between said tap and said condenser, said amplifying device comprising a transistor having a base circuit connected to the other terminal of said condenser and an output terminal connected to the other terminal of the source, said transistor operating to cause discharge of the condenser when the current through the transistor reaches a predetermined maximum.

21. In the device claimed in claim 20, an adjustable resistor connected to said base circuit.

22. The device claimed in claim 20, in which the output terminal and one of the input terminals of said transistor comprise collector and emitter electrodes respectively with the collector electrode arranged for connection to a potential of one value and said emitter connected to said tap.

23. In the device claimed in claim 22, a variable bias means connected between said base and collector circuit.

24. A light flashing device comprising a transformer having a primary and a high voltage secondary, a light source connected on one side to said one end of said secondary and arranged to be connected on its other side to an energizing point of potential, a tap on said primary, a condenser having one terminal connected to one end of said primary, a source of potential having one terminal connected to the other end of said primary, and an amplifying device having an input terminal and a common terminal connected between said tap and said condenser, said amplifying device comprising a transistor having a base circuit connected to the other terminal of said condenser and an output terminal connected to the other terminal of the source, the other end of said secondary being unconnected to the other claimed elements, said transistor operating to cause discharge of the condenser when the current through the transistor reaches a predetermined maximum.

References Cited in the file of this patent

UNITED STATES PATENTS

| | | |
|---|---|---|
| 2,718,613 | Harris | Sept. 20, 1955 |
| 2,887,592 | Stout | May 19, 1959 |
| 2,895,081 | Crownover | July 14, 1959 |

FOREIGN PATENTS

| | | |
|---|---|---|
| 1,175,716 | France | Nov. 17, 1958 |